(12) United States Patent
Wang et al.

(10) Patent No.: US 9,187,636 B2
(45) Date of Patent: *Nov. 17, 2015

(54) COMPOSITE MATERIAL WITH POLYAMIDE PARTICLE MIXTURES

(71) Applicant: Hexcel Corporation, Dublin, CA (US)

(72) Inventors: Yen-Seine Wang, San Ramon, CA (US); Maureen Boyle, Castro Valley, CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,940

(22) Filed: Feb. 13, 2014

(65) Prior Publication Data

US 2014/0163139 A1    Jun. 12, 2014

Related U.S. Application Data

(63) Continuation-in-part of application No. 13/594,819, filed on Aug. 26, 2012.

(51) Int. Cl.

| | |
|---|---|
| B32B 27/00 | (2006.01) |
| C08K 7/02 | (2006.01) |
| C08L 63/00 | (2006.01) |
| C08J 5/24 | (2006.01) |
| D06N 3/00 | (2006.01) |
| C08J 5/04 | (2006.01) |

(52) U.S. Cl.
CPC .. C08L 63/00 (2013.01); C08J 5/24 (2013.01); C08J 5/042 (2013.01); C08J 2363/00 (2013.01); C08J 2477/02 (2013.01); D06N 3/00 (2013.01); D06N 3/0015 (2013.01); D06N 2201/087 (2013.01)

(58) Field of Classification Search
CPC ...... C08J 5/24; C08J 2477/06; C08J 2363/00; C08L 63/00
See application file for complete search history.

(56) References Cited

U.S. PATENT DOCUMENTS

| | | | |
|---|---|---|---|
| 6,045,898 A | 4/2000 | Kishi et al. | |
| 6,429,157 B1 | 8/2002 | Kishi et al. | |
| 6,440,257 B1 | 8/2002 | Zhou et al. | |
| 6,508,910 B2 | 1/2003 | Zhou et al. | |
| 6,515,081 B2 | 2/2003 | Oosedo et al. | |
| 7,968,179 B2 * | 6/2011 | Tilbrook et al. | 428/297.4 |
| 2005/0197026 A1 | 9/2005 | Keuchel et al. | |
| 2008/0286578 A1 | 11/2008 | Tilbrook et al. | |

FOREIGN PATENT DOCUMENTS

| | | | |
|---|---|---|---|
| GB | 201307898 | * | 6/2013 |
| WO | WO 2013/186389 | * | 12/2013 |

* cited by examiner

*Primary Examiner* — Ana Woodward
(74) *Attorney, Agent, or Firm* — W. Mark Bielawski; David J. Oldenkamp

(57) ABSTRACT

Pre-impregnated composite material (prepreg) is provided that can be cured/molded to form composite parts having high damage tolerance and interlaminar fracture toughness. The matrix resin includes a thermoplastic particle component that includes a mixture of polyamide 12 particles and polyamide 11 particles.

20 Claims, No Drawings

COMPOSITE MATERIAL WITH POLYAMIDE PARTICLE MIXTURES

This application is a continuation-in-part of co-pending U.S. patent application Ser. No. 13/594,819, which was filed on Aug. 26, 2012.

BACKGROUND OF THE INVENTION

1. Field of the Invention

The present invention relates generally to pre-impregnated composite material (prepreg) that is used in making high performance composite parts. More particularly, the invention is directed to providing prepreg that may be cured/molded to form composite parts having high compression strength, as well as, high damage tolerance and interlaminar fracture toughness.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part is of critical importance.

Pre-impregnated composite material (prepreg) is used widely in the manufacture of composite parts. Prepreg is a combination that typically includes uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network affect the structural properties of the part. Prepreg is a preferred material for use in manufacturing load-bearing or primary structural parts and particularly aerospace primary structural parts, such as wings, fuselages, bulkheads and control surfaces. It is important that these parts have sufficient strength, damage tolerance and other requirements that are routinely established for such parts.

The fiber reinforcements that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber reinforcement configurations are combined with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The compression strength of a cured composite material is largely dictated by the individual properties of the reinforcing fiber and matrix resin, as well as the interaction between these two components. In addition, the fiber-resin volume ratio is an important factor. The compression strength of a composite part is typically measured at room temperature under dry conditions. However, the compression strength is also routinely measured at elevated temperature (180° F.) under wet conditions. Many parts exhibit a significant drop in compression strength under such hot and wet conditions.

In many aerospace applications, it is desirable that the composite part exhibit high compression strength under both room temperature/dry conditions and hot/wet conditions. However, attempts to keep compression strength constant under hotter/wetter conditions often result in negative effects on other desirable properties, such as damage tolerance and interlaminar fracture toughness.

Selecting higher modulus resins can be an effective way to increase the compression strength of a composite. However, this can result in a tendency to reduce damage tolerance, which is typically measured by a decrease in compressive properties, such as compression after impact (CAI) strength. Accordingly, it is very difficult to achieve a simultaneous increase in both the compression strength and damage tolerance Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces.

A simple way to increase interlaminar fracture toughness has been to increase the ductility of the matrix resin by introducing thermoplastic sheets as interleaves between layers of prepreg. However, this approach tends to yield stiff, tack-free materials that are difficult to use. Another approach has been to include a toughened resin interlayer of about 20 to 50 microns thickness between fiber layers. The toughened resin includes thermoplastic particles. Polyamides have been used as such thermoplastic particles.

Although existing prepregs are well suited for their intended use in providing composite parts that are strong and damage tolerant, there still is a continuing need to provide prepreg that may be used to make composite parts that have even higher levels of compression strength under hot and wet conditions, high damage tolerance (CAI) and high interlaminar fracture toughness (G1c and G2c).

SUMMARY OF THE INVENTION

In accordance with the present invention, pre-impregnated composite material (prepreg) is provided that can be molded to form composite parts that have high levels of strength, damage tolerance and interlaminar fracture toughness. This is achieved without causing any substantial negative impact upon the physical or chemical characteristics of the uncured prepreg or the cured composite part.

The pre-impregnated composite materials of the present invention are composed of reinforcing fibers and a matrix. The matrix includes a resin component made up of one or more difunctional epoxy resins and multifunctional epoxy resins. The matrix further includes a thermoplastic particle component, a thermoplastic toughening agent and a curing agent. As a feature of the present invention, the thermoplastic particle component is composed of thermoplastic particles made from polyamide 12 (Nylon 12 or PA12) and thermoplastic particles made from polyamide 11 (Nylon 11 or PA11).

The present invention also covers methods for making the prepreg and methods for molding the prepreg into a wide variety of composite parts. The invention also covers the composite parts that are made using the improved prepreg.

It has been found that the use of a matrix resin that contains a mixture of polyamide 12 thermoplastic particles and polyamide 11 thermoplastic particles, as set forth above, results in the formation of prepreg that may be molded to form composite parts that have high levels of strength, damage tolerance and interlaminar fracture toughness in comparison to conventional systems.

The above described and many other features and attendant advantages of the present invention will become better understood by reference to the following detailed description.

DETAILED DESCRIPTION OF THE INVENTION

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes.

The pre-impregnated composite materials of the present invention are composed of reinforcing fibers and an uncured resin matrix. The reinforcing fibers can be any of the conventional fiber configurations that are used in the prepreg industry. The matrix resin includes a resin component that is made up of difunctional epoxy resins and/or multifunctional aromatic epoxy resins with a functionality greater than two. The matrix resin further includes a thermoplastic particle component, a thermoplastic toughening agent and a curing agent. A feature of the present invention is that the thermoplastic particle component is composed of a mixture of polyamide 12 particles and polyamide 11 particles.

It was discovered that thermoplastic toughened epoxy resins that include a mixture of PA12 particles and PA11 particles, especially when combined with certain carbon fibers, such as IM7 carbon fibers, provide cured laminates that have high interlaminar fracture toughness.

The difunctional epoxy resins that are used to form the resin component of the matrix may be any suitable difunctional epoxy resin. It will be understood that this includes any suitable epoxy resins having two epoxy functional groups. The difunctional epoxy resin may be saturated, unsaturated, cycloaliphatic, alicyclic or heterocyclic. The difunctional epoxy may be used alone or in combination with multifunctional epoxy resins to form the resin component. Resin components that contain only multifunctional epoxy are also possible.

Difunctional epoxy resins, by way of example, include those based on: diglycidyl ether of Bisphenol F, Bisphenol A (optionally brominated), glycidyl ethers of phenol-aldelyde adducts, glycidyl ethers of aliphatic diols, diglycidyl ether, diethylene glycol diglycidyl ether, Epikote, Epon, aromatic epoxy resins, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285 and from Ciba-Geigy (location) under the trade name LY9703. A difunctional epoxy resin may be used alone or in any suitable combination with other difunctional epoxies or multifunctional epoxies to form the resin component.

The resin component may include one or more epoxy resins with a functionality that is greater than two. Preferred multifunctional epoxy resins are those that are trifunctional or tetrafunctional. The multifunctional epoxy resin may be a combination of trifunctional and multifunctional epoxies. The multifunctional epoxy resins may be saturated, unsaturated, cycloaliphatic, alicyclic or heterocyclic.

Suitable multifunctional epoxy resins, by way of example, include those based upon: phenol and cresol epoxy novolacs, glycidyl ethers of phenol-aldehyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morrestown, N.J.). Suitable trifunctional epoxy resins, by way of example, include those based upon: phenol and cresol epoxy novolacs; glycidyl ethers of phenol-aldehyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

An exemplary trifunctional epoxy resin is triglycidyl meta-aminophenol. Triglycidyl meta-aminophenol is available commercially from Huntsman Advanced Materials (Monthey, Switzerland) under the trade name Araldite MY0600 and from Sumitomo Chemical Co. (Osaka, Japan) under the trade name ELM-120. Another exemplary trifunctional epoxy resin is triglycidyl para-aminophenol. Triglycidyl para-aminophenol is available commercially from Huntsman Advanced Materials (Monthey, Switzerland) under the trade name Araldite MY0510.

Additional examples of suitable multifunctional epoxy resin include, by way of example, N,N,N',N'-tetraglycidyl-4,4'-diaminodiphenyl methane (TGDDM available commercially as Araldite MY720 and MY721 from Huntsman Advanced Materials (Monthey. Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl), and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

The preferred resin component contains difunctional epoxy, trifunctional epoxy and tetrafunctional epoxy. In the preferred resin component, the difunctional epoxy resin is present in the range 7 wt % to 27 wt %, based on the total weight of the resin matrix. Preferably, the difunctional epoxy resin is present in the range 12 wt % to 22 wt %, based on the total weight of the resin matrix. More preferably, the difunctional epoxy resin is present in the range 15 wt % to 19 wt %, based on the total weight of the resin matrix. The trifunctional epoxy resin is present in the range 15 wt % to 35 wt %, based on the total weight of the resin matrix. Preferably, the trifunctional epoxy resin is present in the range 20 wt % to 30 wt %, based on the total weight of the resin matrix. More preferably, the trifunctional epoxy resin is present in the range 24 wt % to 28 wt %, based on the total weight of the resin matrix. The tetrafunctional epoxy resin is present in the range 5 wt % to 15 wt %, based on the total weight of the resin matrix. Preferably, the tetrafunctional epoxy resin is present in the range 8 wt % to 12 wt %, based on the total weight of the resin matrix. More preferably, the tetrafunctional epoxy resin is present in the range 9 wt % to 11 wt %, based on the total weight of the resin matrix. Combinations of the various preferred ranges for the three types of epoxy resins in the preferred resin component are possible.

The prepreg matrix in accordance with the present invention also includes a thermoplastic particle component that is made up of polyamide particles composed of polyamide 12 and polyamide particles that are composed of polyamide 11.

Polyamide 12 particles are available commercially from a number of sources. The preferred polyamide 12 particles are available from Kobo Products under the trade name SP10L. SP10L particles contain over 98 wt % PA 12. The particle size distribution is from 7 microns to 13 microns with the average particle size being 10 microns. The density of the particles is 1 g/cm$^3$. It is preferred that the PA 12 particles are at least 95 wt % PA12, excluding moisture content.

Polyamide 11 particles are also available commercially from a number of sources. The preferred polyamide 11 particles are available from Arkema under the trade name Rislan PA11. These particles contain over 98 wt % PA 11 and have a particle size distribution of 15 microns to 25 microns. The average particle size is 20 microns. The density of the Rislan PA11 particles is 1 g/cm$^3$. It is preferred that the PA 11 particles are at least 95 wt % PA11, excluding moisture content Preferably, both the PA12 and PA11 polyamide particles should have particle sizes of below 100 microns. It is preferred that the particles range in size from 5 to 60 microns and more preferably from 5 to 30 microns. It is preferred that the average particle size is from 5 to 20 microns. The particles may be regular or irregular in shape. For example, the particles may be substantially spherical or they can be particles with a jagged shape. It is preferred that the PA11 particles have an average particle size that is larger than the PA12 particles. Preferably, the average PA12 particles size will range from 5 to 15 microns and the average PA11 particle size will range from 15 to 25 microns.

The thermoplastic particle component is present in the range 5 wt % to 20 wt %, based on the total weight of the matrix. Preferably, there will be from 5 to 15 wt % thermoplastic particles. Most preferably, the matrix will contain from 9 to 13 wt % thermoplastic particles. The relative amounts of PA12 and PA11 particles may be varied. The weight amount of PA12 particles is preferably equal to or greater than the weight amount of PA 11 particles. It is preferred that the weight amount of PA 12 particles be greater than the weight amount of PA 11 particles. Preferred weight ratios of PA12 particles to PA11 particles range from 1.1:1.0 to 1.5:1.0.

The prepreg matrix resin includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methyllhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines. e.g., 1,3-diaminobenzene, 1,4-diaminobenzene, 4,4'-diamino-diphenyhnethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS). Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals. Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) is selected so that it provides curing of the matrix at suitable temperatures. The amount of curing agent required to provide adequate curing of the matrix will vary depending upon a number of factors including the type of resin being cured, the desired curing temperature and curing time. Curing agents typically may also include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman.

The curing agent is present in an amount that ranges from 10 wt % to 30 wt % the uncured matrix. Preferably, the curing agent is present in an amount that ranges from 15 wt % to 25 wt %. More preferably, the curing agent is present in the range 18 wt % to 24 wt % of the uncured matrix.

3,3'-DDS is a particularly preferred curing agent. It is preferably used as the sole curing agent in an amount ranging from 19 wt % to 23 wt %. Small amounts (less than 2 wt %) of other curatives, such as 4,4'-DDS, may be included, if desired.

The matrix of the present invention also includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added.

Exemplary thermoplastic toughening agents/particles include any of the following thermoplastics, either alone or in combination: polysulfones, polyethersulfones, high performance hydrocarbon polymers, elastomers, and segmented elastomers.

The toughening agent is present in the range 5 wt % to 26 wt %, based on the total weight of the uncured resin matrix. Preferably, the toughening agent is present in the range 8 wt %1 to 23 wt %01. More preferably, the toughening agent is present in the range 13 wt % to 18 wt %. A suitable toughening agent, by way of example, is particulate polyethersulfone (PES) sold under the trade name Sumikaexcel 5003P, which is commercially available from Sumitomo Chemicals. Alternatives to 5003P are Solvay polyethersulphone 105RP, or the non-hydroxyl terminated grades such as Solvay 1054P. Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the matrix.

The matrix may also include additional ingredients, such as performance enhancing or modifying agents and additional thermoplastic polymers provided they do not adversely affect the tack and outlife of the prepreg or the strength and damage tolerance of the cured composite part. The performance enhancing or modifying agents, for example, may be selected from flexibilizers, non-particulate toughening agents, accelerators, core shell rubbers, flame retardants, wetting agents, pigments/dyes, UV absorbers, anti-fungal compounds, fillers, conducting particles, and viscosity modifiers.

Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea](e.g. Dyhard UR500 available from Degussa).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminuma, nickel, conducting grades of carbon, buckminsterfullerene, carbon nanotubes and carbon nanofibres. Metal-coated fillers may also be used, for example nickel coated carbon particles and silver coated copper particles.

The matrix may include small amounts (less than 5 wt %) of an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4, 6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The resin matrix is made in accordance with standard prepreg matrix processing. In general, the various epoxy resins are mixed together at room temperature to form a resin mix to which the thermoplastic toughening agent is added. This mixture is then heated to about 120° C. for about 1 to 2 hours to dissolve the thermoplastic toughening agent. The mixture is then cooled down to about 80° C. and the remainder of the ingredients (thermoplastic particle component, curing agent and other additive, if any) is mixed into the resin to form the final matrix resin that is impregnated into the fiber reinforcement.

The matrix resin is applied to the fibrous reinforcement in accordance with any of the known prepreg manufacturing techniques. The fibrous reinforcement may be fully or partially impregnated with the matrix resin. In an alternate embodiment, the matrix resin may be applied to the fiber fibrous reinforcement as a separate layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers. Preferred carbon fibers are in the form of tows that contain from 3,000 to 15,000 carbon filaments (3K to 15K). Commercially available carbon fiber tows that contain 6,000 or 12,000 carbon filaments (6K or 12K) are preferred.

The resin formulations of the present invention are particularly effective in providing laminates with high G1c values (higher than 3.0) when the carbon tow contains from 10,000 to 14,000 filaments, the tensile strength is from 750 to 860 ksi, the tensile modulus is from 35 to 45 Msi, the strain at failure is 1.5 to 2.5%, the density is 1.6 to 2.0 g/cm$^3$ and the weight per length is from 0.2 to 0.6 g/m. 6K and 12K IM7 carbon tows (available from Hexcel Corporation) are preferred. IM7 12K fibers have a tensile strength of 820 ksi, the tensile modulus is 40 Msi, the strain at failure is 1.9%, the density is 1.78 g/cm$^3$ and the weight per length is 0.45 g/m. IM7 6K fibers have a tensile strength of 800 ksi, the tensile modulus is 40 Msi, the strain at failure is 1.9%, the density is 1.78 g/cm$^3$ and the weight per length is 0.22 g/m.

The fibrous reinforcement may comprise cracked (i.e. stretch-broken) or selectively discontinuous fibers, or continuous fibers. It is envisaged that use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, tow-pregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred matrix resin includes from 15 wt % to 19 wt % Bisphenol-F diglycidyl ether (GY285); from 24 wt % to 28 wt % triglycidyl-m-aminophenol (MY0600); from 8 wt % to 13 wt % tetrafunctional epoxy (MY721); from 13 wt % to 18 wt % polyethersulfone (5003P) as a toughening agent; from 4 wt % to 9 wt % polyamide 12 particles (SP10L); from 2 wt % to 7 wt % polyamide 11 particles (Rislan PA11) where the weight ratio of polyamide 12 particles to polyamide 11 particles is from 1.2:1.0 to 1.4:1.0; and from 18 wt % to 23 wt % 3,3'-DDS as the curing agent.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high compressive strength, interlaminar fracture toughness and resistance to impact damage are needed.

In order that the present invention may be more readily understood, reference will now be made to the following background information and examples of the invention.

Example 1

A preferred exemplary resin formulation in accordance with the present invention is set forth in TABLE 1. A matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients added and mixed in thoroughly.

TABLE 1

| Ingredient | Amount (Wt. %) |
| --- | --- |
| Bispbenol-F diglycidyl ether (GY285) | 17.01 |
| Trifunctional meta-glycidyl amine (MY0600) | 25.72 |
| N,N,N',N'-tetraglycidyl-4,4'-diaminodiphenyl methane (MY721) | 10.29 |
| Thermoplastic Toughening Agent (polyether sulfone - 5003P) | 15.43 |
| PA12 Particles (SP10L) | 6.25 |
| PA11 Particles (Rislan 11) | 4.75 |
| Aromatic diamine curing agent (3,3-DDS) | 20.55 |

Exemplary prepreg was prepared by impregnating one or more layers of unidirectional carbon fibers with the resin formulation of TABLE 1. The unidirectional carbon fibers (12K IM7 available from Hexcel Corporation) were used to make a prepreg in which the matrix resin amounted to 35 weight percent of the total uncured prepreg weight and the fiber areal weight was 145 grams per square meter (gsm). A variety of prepreg lay ups were prepared using standard prepreg fabrication procedures. The prepregs were cured in an autoclave at 177° C. for about 2 hours. The cured prepregs were then subjected to standard tests to determine their tolerance to damage (CAI) and interlaminar fracture toughness (G1c and G2c).

Compression after Impact (CAI) was determined using a 270 in-lb impact against a 32-ply quasi-isotropic laminate. The laminate was cured at 177° C. for 2 hours in the autoclave. The final laminate thickness was about 4.5 mm. The consolidation was verified by c-scan. The specimens were machined, impacted and tested in accordance with Boeing test method BSS7260 per BMS 8-276. Values are normalized to a nominal cured laminate thickness of 0.18 inches.

G1c and G2c are standard tests that provide a measure of the interlaninar fracture toughness of the cured laminate. G1c and G2c were determined as follows. A 26-ply unidirectional laminate was cured with a 3 inch fluoroethylene polymer (FEP) film inserted along one edge, at the mid-plane of the layup, perpendicular to the fiber direction to act as a crack starter. The laminate was cured for 2 hours at 177° C. in an autoclave and gave a nominal thickness of 3.8 mm. Consolidation was verified by C-scan. Both G1c and G2c samples were machined from the same cured laminate. G1c was tested in accordance with Boeing test method BSS7233 and G2c was tested in accordance with BSS7320. Values for G1c and G2c were not normalized.

The 0° Compressive strength at room temperature under dry conditions was determined according to BS7260. The 0° Compressive strength at 180° F. under wet conditions was also determined according to BSS7260.

The CAI of the cured prepregs was 54.7 with G1c and G2c being 3.6 and 10.4, respectively. The CAI and G2c are both well above acceptable limits for structural parts. However, the G1c of 3.6 was exceptionally high and unexpected. G1c values of 3.0 and greater are considered to be very high values for interlaminar fracture toughness. The 0° Compressive strength at room temperature under dry conditions was 293 and the 0° Compressive strength at 180° F. under wet conditions was 188.

Example 2

Another exemplary prepreg was prepared in the same manner as Example 1. The prepreg was the same as Example 1, except that the fiber reinforcement was 12K IM10. IM10 is a unidirectional carbon fiber material which is also available from Hexcel Corporation (Dublin, Calif.). IM10 12K fibers have a tensile strength of 1010 ksi, the tensile modulus is 45 Msi, the strain at failure is 2.0%, the density is 1.79 g/cm$^3$ and the weight per length is 0.32 g/m. The exemplary prepreg included matrix resin in an amount of 35 weight percent of the total uncured prepreg weight and the fiber areal weight of the IM10 fiber was 145 grams per square meter (gsm).

32-ply and 26-ply exemplary laminates were cured and tested in the same manner as Example 1. The CAI of the cured prepregs was 54.4 with G1c and G2c being 2.1 and 9.1, respectively. The CAI, G1c and G2c are all above acceptable limits for structural parts. The prepreg of Example 1, where the fiber is IM7 carbon fiber, is preferred, since the G1c is significantly higher. The 0° Compressive strength at room temperature under dry conditions was 271 and the 0° Compressive strength at 180° F. under wet conditions was 193.

Examples 3-5

Three other exemplary prepregs were prepared in the same manner as Example 2, except that the amounts of PA12 particles and PA11 particles were varied. The exemplary matrix formulations are set forth in TABLE 2. The exemplary prepregs included matrix resin in an amount of 35 weight percent of the total uncured prepreg weight and the fiber areal weight of the 12K IM10 fiber was 145 grams per square meter (gsm).

TABLE 2

| Ingredient | Ex. 3 (wt %) | Ex. 4 (wt %) | Ex. 5 (wt %) |
|---|---|---|---|
| GY285 | 17.3 | 16.3 | 16.3 |
| MY0600 | 26.2 | 24.6 | 24.6 |
| MY721 | 10.5 | 9.8 | 9.8 |
| PES 5003P | 15.7 | 14.7 | 14.7 |
| Orgasol 1002 | | | |
| Orgasol 3803 | | | |
| Rilsan PA11 | 4.75 | 7.50 | 7.50 |
| SP10L | 4.75 | 7.50 | 7.50 |
| 3,3-DDS | 20.1 | | 19.6 |
| 4,4-DDS | | 19.6 | |

The cured exemplary prepregs were subjected to the same testing procedures as in Example 1. The results are set forth in TABLE 3.

TABLE 3

| | Ex. 3 | Ex. 4 | Ex. 5 |
|---|---|---|---|
| CAI | 53.7 | 55.5 | 55.2 |
| G1c | 2.0 | 2.3 | 2.4 |
| G2c | 6.1 | 12.0 | 12.0 |
| 0° Comp. Strength (RT/dry) | 284 | 256 | 277 |
| 0° Comp. Strength (180° C./wet) | 195 | 154 | 171 |

The Compressive strengths, CAI, G1c and G2c are all above acceptable limits for structural parts. It is preferred that the amount of PA12 particles and PA11 particles be 5 to 20 wt. % the total resin weight in order to maximize the both G1c and G2c interlaminar fracture toughness. It is also preferred that the weight amount of PA12 particles is greater than the weight amount of PA11 particles. The preferred ratios are from 1.1:1 to 1.5:1.

Comparative Example 1

A comparative prepreg was prepared and cured in the same manner as Example 1. The comparative matrix formulation contained polyamide particles that are available commercially from Arkema (France) under the trade names Orgasol 1002 and Orgasol 3803. Orgasol 1002 is composed of 100% PA6 particles having an average particle size of 20 microns. Orgasol 3803 is composed of particles that are a copolymer of 80% PA12 and 20% PA6 with the mean particle size being from 17 to 24 microns. The prepreg was prepared using the same IM7 carbon fiber as Example 1. The prepreg contained 35% resin by weight and had a fiber areal weight of 145 gsm. The formulation used for the comparative prepreg is set forth in TABLE 4.

TABLE 4

| Ingredient | Amount (wt %) |
|---|---|
| Bisphenol-F diglycidyl ether (GY285) | 17.3 |
| Trifunctional meta-glycidyl amine (MY0600) | 26.2 |
| N,N,N'N'-tetraglycidyl-4,4'-diaminodiphenyl methane (MY721) | 10.5 |
| PES (5003P) | 15.7 |
| 4,4-DDS | 20.9 |

TABLE 4-continued

| Ingredient | Amount (wt %) |
|---|---|
| Polyamide 12 Particles (Orgasol 1002) | 4.75 |
| Polyamide 12 Particles (Orgasol 3803) | 4.75 |

The cured comparative prepreg was tested in the same manner as Example 1. The CAI was 57.9 and the G1c and G2c were 2.1 and 7.3, respectively. The 0° Compressive strength at room temperature under dry conditions was 269 and the 0° Compressive strength at 180° F. under wet conditions was 160. The G1c of the cured comparative prepregs were substantially below the G1c of the Example 1 cured prepregs that were made using epoxy resin in accordance with the present invention, which includes SP10L polyamide 12 particles and Rislan polyamide particles in a total amount of 11 wt % based on the total weight of the resin matrix and wherein the ratio of SP10L particles to Rislan PA11 particles is 1.3:1.

Comparative Examples 2-4

Comparative prepregs (CE 2 to CE 4) were prepared in the same manner as Example 2 using 12K IM10 fibers. The formulations for the comparative matrices are set forth in TABLE 5. Rislan PA11 particles are made from polamide11 and are available commercially from Arkema. The Rislan PA11 particles had an average particle size of 20 microns.

TABLE 5

| Ingredient | CE 2 (wt %) | CE 3 (wt %) | CE 4 (wt %) |
|---|---|---|---|
| GY285 | 17.3 | 17.0 | 17.0 |
| MY0600 | 26.2 | 25.7 | 25.7 |
| MY721 | 10.5 | 10.3 | 10.3 |
| PES 5003P | 15.7 | 15.4 | 15.4 |
| Orgasol 1002 | 4.75 | 4.75 | 4.75 |
| Orgasol 3803 | 4.75 | | |
| Rilsan PA11 | | | |
| SP10L | | 6.25 | 6.25 |
| 3,3-DDS | 20.9 | 20.6 | 10.3 |
| 4,4-DDS | | | 10.3 |

The cured prepregs were subjected to the same testing procedures as in Example 1. The results are set forth in TABLE 6.

TABLE 6

| | CE 2 | CE 3 | CE 4 |
|---|---|---|---|
| CAI | 54.9 | 48.8 | 49.3 |
| G1c | 2.2 | 2.2 | 2.4 |
| G2c | 6.3 | 6.9 | 6.6 |
| 0° Comp. Strength (RT/dry) | 259 | 263 | 256 |
| 0° Comp. Strength (180° C./wet) | 192 | 170 | 169 |

Comparative Example 2 is the same as Comparative Example 1, except that the fibrous support is 12K IM10 carbon fiber instead of 12K IM7 carbon fiber. Both comparative examples have equivalent interlaminar fracture toughness (2.2 and 2.1, respectively). This shows that the fiber type had little effect on G1c when the thermoplastic particles were all made from PA12. Accordingly, it is an unexpected result that the interlaminar fracture toughness would increase from 2.1 to 3.6 when the same change from 12K IM10 carbon fiber to 12K IM7 carbon fiber was made with a resin matrix in accordance with the present invention, as set forth in Examples 1 and 2.

Comparative Examples 3 and 4 have acceptable interlaminar fracture toughness. However, the CAI values are less than 50, which is much lower than the CAI values obtained using resin formulations in accordance with the present invention.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A pre-impregnated composite material comprising:
    A) a carbon tow which comprises from 10,000 to 14,000 carbon filaments wherein the weight per length of said carbon tow is from 0.2 to 0.6 g/m and wherein the tensile strength of the carbon tow is from 750 to 860 ksi and the tensile modulus of the carbon tow is from 35 to 45 Msi; and
    B) an uncured resin matrix comprising:
        a) from 15 wt % to 19 wt % diglycidyl ether of Bisphenol F, based on the total weight of said uncured resin matrix;
        b) from 24 wt % to 28 wt % triglycidyl meta-aminophenol, based on the total weight of said uncured resin matrix;
        c) from 8 wt % to 13 wt % tetrafunctional para-glycidyl amine, based on the total weight of said uncured resin matrix;
        d) a thermoplastic particle component comprising a mixture of polyamide 12 particles and polyamide 11 particles, said thermoplastic particle component being present in the range of 5 wt % to 20 wt %, based on the total weight of said uncured resin matrix, and wherein the weight ratio of polyamide 12 particles to polyamide 11 particles ranges from 1:1 to 1.5:1;
        e) a thermoplastic toughening agent selected from the group consisting of polyethersulfone and polysulfone, said thermoplastic toughening agent being present in the range of 13 wt % to 18 wt %, based on the total weight of said uncured resin matrix; and
        f) a curing agent to provide curing of said uncured resin matrix wherein said prepreg, when cured, has a G1c of 3.6 when tested in accordance with BSS7320.

2. A pre-impregnated composite material according to claim 1 wherein said tetrafunctional para-glycidyl amine is N,N,N',N'-tetraglycidyl-4,4'-diaminodiphenyl methane.

3. A pre-impregnated composite material according to claim 1 wherein said carbon tow comprises 12,000 filaments, wherein the weight per length of said carbon tow is 0.45 g/m and wherein the tensile strength of said carbon tow is 820 ksi and the tensile modulus of said carbon tow is 40 Msi.

4. A pre-impregnated composite material according to claim 1 wherein the weight ratio of polyamide 12 particles to polyamide 11 particles is 1.3:1.

5. A pre-impregnated composite material according to claim 1 wherein said toughening, agent is polyether sulfone.

6. A pre-impregnated composite material according to claim 1 wherein said curing agent is an aromatic amine.

7. A pre-impregnated composite material according to claim 6 wherein said aromatic amine is 3,3'-diaminodiphenyl sulphone.

8. A composite part comprising a pre-impregnated composite material according to claim 1 which has been cured.

9. A composite part according to claim 8 which has a G1c interlaminar fracture toughness of 3.6 when tested in accordance with BSS7320.

10. A composite part according to claim 9 wherein said composite part forms at least part of an aircraft primary structure.

11. A pre-impregnated composite material according to claim 1 wherein the average particle size of said polyamide 12 particles is from 5 microns to 15 microns and wherein the average particle size of said polyamide 11 particles is from 15 microns to 25 microns.

12. A pre-impregnated composite material according to claim 11 wherein the weight ratio of polyamide 12 particles to polyamide 11 particles is 1.3:1.

13. A pre-impregnated composite material according to claim 1 wherein the thermoplastic particle component is present in an amount of from 9 wt % to 13 wt %, based on the total weight of said uncured resin matrix.

14. A method for making a pre-impregnated composite material, said method comprising the steps of:
   A) providing a carbon tow which comprises from 10,000 to 14,000 carbon filaments wherein the weight per length of said carbon tow is from 0.2 to 0.6 g/m and wherein the tensile strength of the carbon tow is from 750 to 860 ksi and the tensile modulus of the carbon tow is from 35 to 45 Msi; and
   B) impregnating said carbon tow with an uncured resin matrix which comprises:
      a) from 15 wt % to 19 wt % diglycidyl ether of Bisphenol F, based on the total weight of said uncured resin matrix;
      b) from 24 wt % to 28 wt % triglycidyl meta-aminophenol, based on the total weight of said uncured resin matrix;
      c) from 8 wt % to 13 wt % tetrafunctional para-glycidyl amine, based on the total weight of said uncured resin matrix;
      d) a thermoplastic particle component comprising a mixture of polyamide 12 particles and polyamide 11 particles, said thermoplastic particle component being present in the range of 5 wt % to 20 wt %, based on the total weight of said uncured resin matrix, and wherein the weight ratio of polyamide 12 particles to polyamide 11 particles ranges from 1:1 to 1.5:1;
      e) a thermoplastic toughening agent selected from the group consisting of polyethersulfone and polysulfone, said thermoplastic toughening agent being present in the range of 13 wt % to 18 wt %, based on the total weight of said uncured resin matrix; and
      f) a curing agent to provide curing of said uncured resin matrix wherein said prepreg, when cured, has a G1c of 3.6 when tested in accordance with BSS7320.

15. A method for making a pre-impregnated composite material according to claim 14 wherein said tetrafunctional para-glycidyl amine is N,N,N',N'-tetraglycidyl-4,4'-diaminodiphenyl methane.

16. A method for making a pre-impregnated composite material according to claim 14 wherein said carbon tow comprises 12,000 filaments, wherein the weight per length of said carbon tow is 0.45 g/m and wherein the tensile strength of said carbon tow is 820 ksi and the tensile modulus of said carbon tow is 40 Msi.

17. A method for making a pre-impregnated composite material according, to claim 16 wherein the weight ratio of polyamide 12 particles to polyamide 11 particles is 1.3:1.

18. A method for making a pre-impregnated composite material according, to claim 14 wherein the weight ratio of polyamide 12 particles to polyamide 11 particles is 1.3:1.

19. A method for making a composite part comprising the step of curing a pre-impregnated composite material according to claim 1 to form a cured prepreg that has a G1c of 3.6 when tested in accordance with BSS7320.

20. A method for making a composite part according to claim 19 wherein said composite part forms at least part of an aircraft primary structure.

\* \* \* \* \*